United States Patent [19]

Doting

[11] Patent Number: 4,619,563
[45] Date of Patent: Oct. 28, 1986

[54] DIAMOND TOOL

[75] Inventor: Jan Doting, Nijmegen, Netherlands

[73] Assignee: D. Drukker & Zn. N.V., Amsterdam, Netherlands

[21] Appl. No.: 632,128

[22] Filed: Jul. 18, 1984

[30] Foreign Application Priority Data

Aug. 4, 1983 [NL] Netherlands .................. 8302757
Nov. 7, 1984 [EP] European Pat. Off. ......... 0133716

[51] Int. Cl.⁴ .................. B23P 15/28; B26D 7/00
[52] U.S. Cl. ...................... 407/118; 76/101 R; 76/DIG. 12
[58] Field of Search .......... 76/101 R, DIG. 12; 407/118, 120

[56] References Cited

U.S. PATENT DOCUMENTS

| | | | |
|---|---|---|---|
| 2,674,028 | 4/1954 | Kontra | 407/118 |
| 3,856,480 | 12/1974 | Johnson et al. | 407/118 |
| 3,868,750 | 3/1975 | Ellis et al. | 407/118 |

FOREIGN PATENT DOCUMENTS

| | | |
|---|---|---|
| 1327 | 11/1931 | Australia ............... 407/118 |
| 639824 | 3/1928 | France . |
| 1239412 | 7/1960 | France . |
| 140010 | 3/1920 | United Kingdom . |
| 707780 | 4/1954 | United Kingdom . |
| 1019067 | 2/1966 | United Kingdom . |

Primary Examiner—Roscoe V. Parker
Attorney, Agent, or Firm—Kane, Dalsimer, Kane, Sullivan and Kurucz

[57] ABSTRACT

A diamond tool comprises a diamond (4) with a cutting edge (5) which diamond is encased in a sinter mass (7) which is brazed to the front end of a tool shank (1). The diamond (4) is brazed to a metal connection block (6) which is encased in the sinter mass (7) together with the diamond.

7 Claims, 3 Drawing Figures

DIAMOND TOOL

The invention relates to a diamond tool having a diamond with a cutting edge, which diamond is encased in a sinter mass which is brazed to the front end of a tool shank.

During manufacture of known diamond tools of this type the diamond is first enclosed in a plug-shaped encasing of for example sintered bronze, whereafter the sinter plug is finished in such a manner that it can be brazed on a tool holder. Subsequently, the front end of the diamond is made free by filing so that a cutting edge of the desired shape can be ground on the diamond.

Such diamond tools are used for example for turning high quality surfaces of metal mirrors and memory discs for computers, for example. As to the quality to be obtained of the surfaces machined with such tools, among others the quality of the cutting edge of the tool, a vibration free rotation of the machine and a clearance free and rigid grip of the tool are of essential importance.

With the further development of the art the requirements which are made upon the machined surfaces are increased still further. For example, the possible recording density on the surface of said computer memory discs is determined among others by the obtainable surface quality of the discs. Practice has shown that problems occur in this respect at the use of said conventional diamond tools, which problems are caused by an insufficient resistance to vibrations of the diamond in the diamond tool. Although the diamond is enclosed in a sintered encasing, there is no bonding between the contacting surfaces of the encasing and the diamond. Therefore, the stability of the diamond during the cutting is dependent on the presence and the magnitude of the clamping forces between the sintered material of the encasing and diamond. In practice it is difficult to guarantee a sufficient clamping of the diamond after sintering the sinter mass. Moreover, during the finishing and brazing of the sinter plug and during grinding the diamond thermical and mechanical circumstances occur which make a good clamping of the diamond more uncertain. Thereby, it can easily happen that the diamond will get into vibration during operation due to the occurring cutting forces or even shows clearance in its encasing, for example in the range of hundredths or tenths or a micrometer. Such phenomena can of course not be compensated by taking measures on the machine.

The invention aims to provide a sintered diamond tool of the above-mentioned kind which obviates these imperfections of the known sintered tools.

To this end, the diamond tool according to the invention is characterized in that the diamond is brazed to a metal connecting block which is encased in the sinter mass together with the diamond. By this connecting block fixedly brazed to the diamond not only the engaging surface between the sinter mass and the component to be clamped consisting of the diamond and said block is substantially increased but it also appears that the sinter mass is able to perfectly hold the metal of this block in particular if it consists of molybdenum. It appeared that in this manner an enclosing of the component consisting of the connecting block and the diamond which is sufficiently rigid and clearance free for many applications, is obtained, wherein an improved vibration damping is also obtained.

In order to obtain a still better bonding of the diamond desired in certain cases, according to the invention it is preferred that the connecting block has at its lower side opposite of the diamond a brazing face lying free of the sinter mass, with which brazing face the block itself is fixedly brazed to the tool shaft also. In this manner a fixed and rigid connection is obtained between the diamond and the tool shaft, while further the sinter mass enclosing the diamond and the connecting block damps possibly occurring vibrations by friction with the surface thereof.

The brazing material used for bonding the diamond to the connecting block should have a melting point which is substantially higher than the sintering temperature of the sinter material and for example, amounts up to approximately 900°–1200° C. Such brazing materials for diamond are known per se and for example consist of a suitable alloy of copper, silver and titanium or of gold to which 4% tantalum is added. In this manner the diamond can first be brazed to the block and subsequently together with this block be encased in a sinter plug without affecting the brazed bond during sintering. In addition to the side of the cutting edge of the diamond to be ground the sinter plug is also filed away at its lower side until the lower surface of the connecting block lies free and can be brazed to the tool shaft together with the sinter mass. For this last mentioned brazing operation the brazing material normally used for this purpose can be applied, the melting point of which is lower and amounts up to maximum approximately 600° C.

According to a favourable embodiment of the invention grooves are provided in the connecting block at the upper side directed to the diamond. Thereby a difference between the thermal coefficient of expansion of the diamond and the material of the connecting block can be accommodated.

According to another embodiment it is however also possible to make the block of a material like molybdenum or a hard metal, the thermal coefficient of expansion of which differs only a little from the same of diamond.

A further advantage of the construction of the diamond tool according to the invention is that in certain cases a smaller diamond can suffice than at the conventional tools because a smaller contacting surface between the sinter mass and the diamond is required.

The invention will be further explained by reference to the drawing, in which an embodiment of the diamond tool of the invention is shown.

Figure 1:
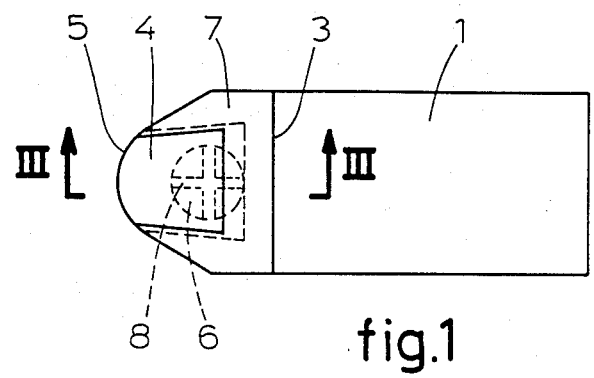
FIG. 1 shows a top view of the tool.
Figure 2:
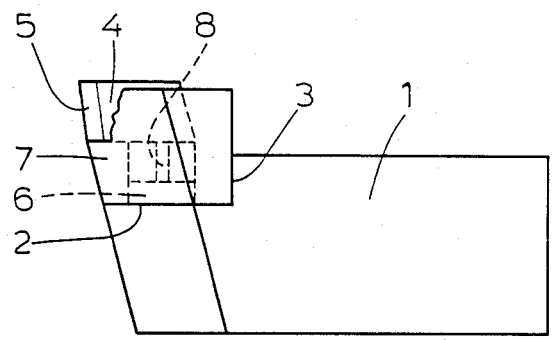
FIG. 2 shows a side view of the tool of FIG. 1.
Figure 3:
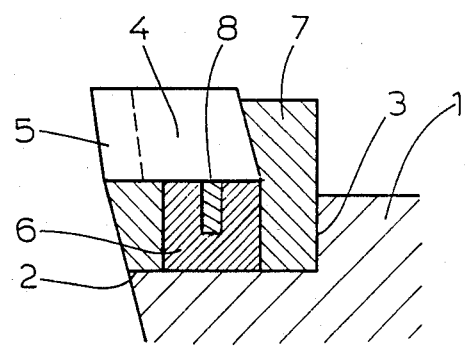
FIG. 3 is a section according to the line III—III of FIG. 1 on a larger scale.

A diamond tool shown comprises a tool shaft 1 of conventional construction, in which at the front side a recessed, stepped seat is provided which is bounded by a horizontal bottom face 2 and a vertical end face 3.

The tool shaft 1 carries at its front side a diamond 4 of conventional shape with a ground cutting edge 5 and obliquely outwardly extending sides and a back side. The diamond 4 is brazed to a cylindrical connecting block 6 by using a brazing material with a high melting point of approximately 900°–1200° C. As brazing material a suitable alloy of copper, silver and titanium is used although other brazing materials can also be used, like for example an alloy consisting of 96% gold and 4% tantalulum.

The assembly of the diamond 4 and the block 6 is subsequently encased in a sinter mass 7 of for example sintered bronze, wherein this mass not only encloses the sides and the back side of the diamond 4 but also joins a large portion of the lower face of the diamond as, as shown, the upper face of the cylindrical block 6 is substantially smaller than the lower face of the diamond. By a suitable machining the formed sinter plug is shaped in such a manner that it fits in the seat 2, 3 of the tool shaft 1, wherein the lower face of the sinter mass is removed thus far that the lower face of the block 6 has become free. After grinding of the cutting edge 5 of the diamond 4 which edge 5 was also made free, the obtained assembly is fixedly brazed in the seat 2, 3 by using a suitable conventional brazing material with a melting point lower than the sintering temperature of the sinter mass. The lower face of the connecting block 6 is directly brazed to the bottom face 2 of the seat.

In the embodiment shown grooves 8 are made in a cross-wise manner in the upper portion of the connecting block 6 in order to provide for a compensation possibility for a diffence between the thermal coefficient of expansion of the diamond and the material of the block 6. However, it is also possible to make the connecting block 6 out of a material, like for example molybdenum, the thermal coefficient of expansion of which differs only a little from the same of diamond, in which case the grooves 8 may be omitted.

By the above-described construction the connecting block 6 forms a fixed and rigid connection between the diamond 4 and the tool shaft 1, whereby the diamond is immovably held on the shaft. The sinter mass joins the diamond and the block along a great surface, whereby a good damping of possibly occurring vibrations in the diamond is obtained.

I claim:

1. A diamond tool comprising a diamond with a cutting edge, a metal connecting block and a tool shaft with a front end, the diamond being brazed to the metal connecting block which together with the diamond is encased in a sinter mass which is brazed to the front end of the tool shaft, wherein the connecting block at its side opposite of the diamond has a brazing face lying free of the sinter mass also being fixedly brazed to the front end of the tool shaft.

2. Diamond tool according to claim 1, having a brazing material used for bonding the diamond to the connecting block wherein the brazing material has a melting point which is substantially higher than the sintering temperature of the sinter material and the melting point is between 900°–1200° C.

3. Diamond tool according to claim 1, wherein the upper face of the connecting block is substantially smaller than the contacting lower face of the diamond.

4. Diamond tool according to claim 1, wherein the connecting block has a cylindrical shape.

5. Diamond tool according to claim 1, wherein grooves are provided in the connecting block at the upper side directed to the diamond.

6. Diamond tool according to claim 5, wherein the grooves form a cross.

7. Diamond tool according to claim 1, wherein the block is made of a suitable metallic material, the thermal coefficient of expansion of which differs only a small amount from that of diamond.

* * * * *